J. C. MOON.
PUMP.
APPLICATION FILED NOV. 26, 1917.
1,349,218.
Patented Aug. 10, 1920.
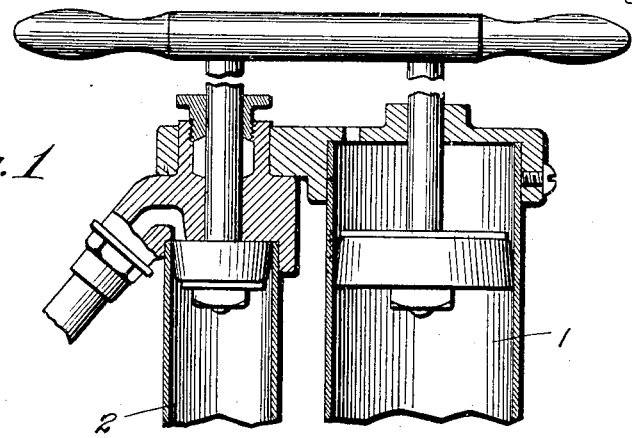
Fig. 1
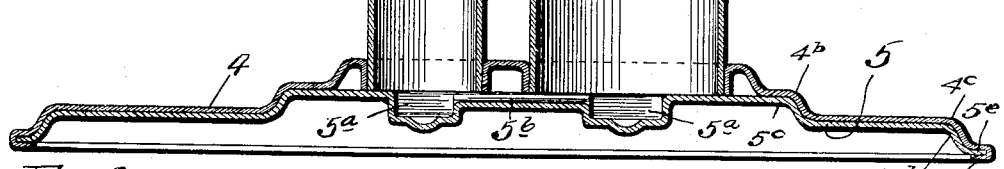
Fig. 2
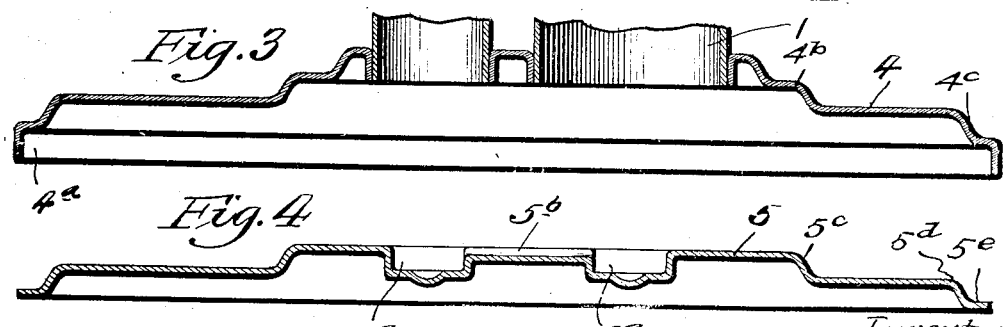
Fig. 3
Fig. 4
Inventor
John C. Moon
By J. M. Greenway, Atty

UNITED STATES PATENT OFFICE.

JOHN C. MOON, OF ST. LOUIS, MISSOURI.

PUMP.

1,349,218.　　　　Specification of Letters Patent.　　Patented Aug. 10, 1920.

Application filed November 26, 1917. Serial No. 204,041.

*To all whom it may concern:*

Be it known that I, JOHN C. MOON, a citizen of the United States, residing at St. Louis, Missouri, have invented a certain new and useful Improvement in Pumps, of which the following is a full, clear, and exact description, such as will enable others skilled in the art to which it appertains to make and use the same, reference being had to the accompanying drawings, forming part of this specification, in which—

Figure 1 is a vertical sectional view through my improved pump.

Fig. 2 is a top plan view of the top plate of the base.

Fig. 3 is a vertical sectional view of the top plate base before the same is assembled.

Fig. 4 is a vertical sectional view of the bottom plate of the base before the same is assembled.

This invention relates to a new and useful improvement in pumps designed especially for use in inflating automobile and bicycle tires, the object being to construct a pump of the character described with a steel base consisting essentially of two plates, a top plate, to which the pump cylinders are brazed, welded or soldered, and the bottom plate secured thereto and which latter forms a duct or passage for connecting the two pump cylinders in addition to strengthening the top plate of the base.

In the drawings, 1 indicates the primary or larger cylinder of the pump, and 2 the secondary or smaller cylinder, in both of which cylinders are arranged pistons secured by a common handle.

4 indicates the top base plate preferably formed of sheet steel pressed in the shape illustrated and in the construction of the pump, the marginal flanges $4^a$ of this top plate are preferably left straight, that is, not folded (in order to permit of the introduction of the bottom plate). When the pump cylinders are arranged in the refolded bosses provided therefor, an acetylene torch is preferably employed to weld the edges of said refolded bosses and said pump cylinders. These parts could be brazed together, or soldered, for that matter, but I prefer to use a welding torch to fuse the contiguous edges of the parts. The top plate having the pump cylinders secured therein is then fitted over the bottom plate and the marginal flanges $4^a$ folded upon and around the edges of the bottom plate 5. This bottom plate 5 preferably fits snugly against the lower face of the top plate and is provided with recesses or depressions $5^a$ to receive the nuts of the pistons, said recesses being connected together by a depression, groove, or channel $5^b$ which forms the duct connecting the lower ends of the cylinders.

The top plate 4 is provided with reinforcing stepped portions $4^b$ and $4^c$ which strengthen the structure and serve to elevate the bosses above the floor line. The steps $4^b$ are preferably arranged in proximity to the bosses, while the marginal step $4^c$ extends entirely around the edge of the top plate. The bottom plate is provided with corresponding reinforcing stepped portions $5^c$ and $5^d$, the former nesting within the steps $4^b$, while the latter, being a marginal stepped portion, extends entirely around the edge of the bottom plate and is nested within the stepped marginal flange $4^c$ of the top plate. Beyond the stepped portion $5^d$ is a horizontally disposed flanged member $5^e$ under which the flange $4^a$ of the top plate is folded.

It will be readily understood that minor changes in the size, form and construction of the various parts of my improved pump can be made and substituted for those herein shown and described, without departing from the spirit of my invention, the scope of which is set forth in the appended claims.

I claim:

1. A pump base comprising a top plate having a plurality of flanged bosses to which pump cylinders are adapted to be secured, said plate having a marginal flange and reinforcing stepped portions, and a bottom plate forming in conjunction with the top plate a conduit or duct leading from one flanged opening to the other, said bottom plate having reinforcing stepped portions which are nested together within the stepped reinforcing portions of the top plate, said bottom plate also having a marginal flange around which the edge of the top plate is folded for the purpose of securing the plates together.

2. A pump base comprising a top plate having flanged bosses to which the pump cylinders are adapted to be secured, said top plate having a reinforcing stepped portion around its marginal edge and a bottom plate having a stepped reinforcing marginal portion nested within the stepped portion of the top plate and provided with a horizontally disposed flange extending outwardly beyond said reinforcing stepped portion, the marginal edge of the top plate being bent around and under the horizontal marginal flange of the bottom plate for the purpose of securing said plates together.

In testimony whereof I hereunto affix my signature this 23d day of November, 1917.

JOHN C. MOON.